No. 752,436. PATENTED FEB. 16, 1904.
A. S. BOYD.
PRUNING SHEARS.
APPLICATION FILED OCT. 21, 1903.
NO MODEL.
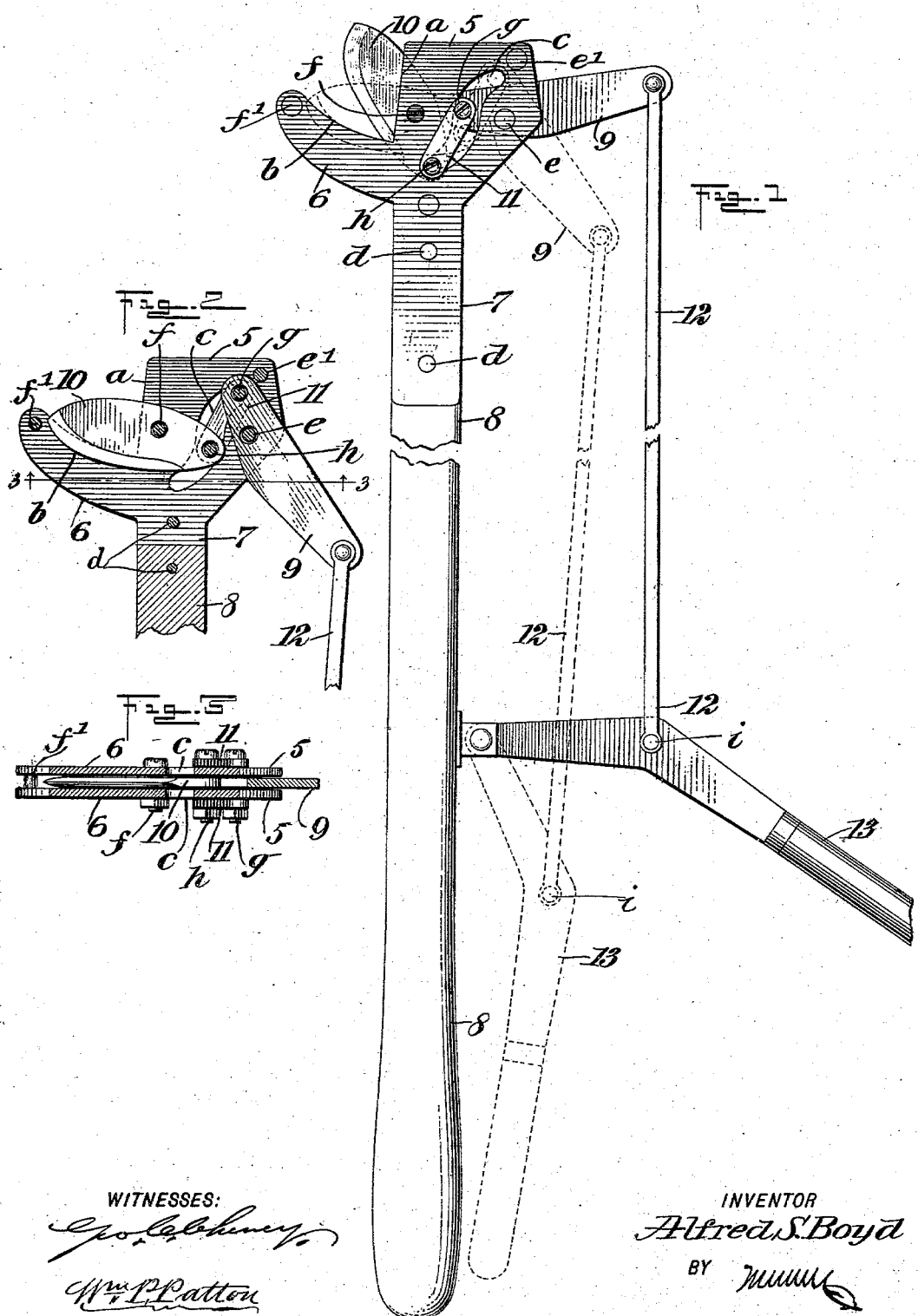
WITNESSES:
INVENTOR
Alfred S. Boyd
BY
ATTORNEYS No. 752,436. Patented February 16, 1904.

UNITED STATES PATENT OFFICE.

ALFRED SHEPHERD BOYD, OF ROCKVILLE, INDIANA.

PRUNING-SHEARS.

SPECIFICATION forming part of Letters Patent No. 752,436, dated February 16, 1904.

Application filed October 21, 1903. Serial No. 177,885. (No model.)

*To all whom it may concern:*

Be it known that I, ALFRED SHEPHERD BOYD, a citizen of the United States, and a resident of Rockville, in the county of Parke and State of Indiana, have invented new and Improved Pruning-Shears, of which the following is a full, clear, and exact description.

This invention relates to a class of shears employed for trimming the surplus growth from shrubs and trees, and has for its object to provide an implement of the class indicated having novel features that adapt it for very effective service, reduces labor incidental to its use, and affords strong, light, compact, and easily-operated shears at a moderate cost.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the improved pruning-shears, showing the shearing movement by full and dotted lines. Fig. 2 is a side view of the device, showing the working details adjusted to close the active blade of the shears, one side of the head-frame being removed to expose said working parts; and Fig. 3 is a transverse sectional view, substantially on the line 3 3 in Fig. 2 seen in the direction of the arrows in said figure.

The drawings represent the features of the invention applied for use as a tree-trimming implement and consist of the following construction and arrangement of details.

A cutter-head for the implement is formed of two similar metal plates, which may be of steel, each having a frame member 5, preferably trapezoidal in contour. From the lower termination of the nearly upright side edge $a$ of the frame member 5 extends laterally a cutter-jaw 6, the upper edge $b$ of which is concave. From the merged lower terminations of the cutting-jaws 6 and frame member 5 of the cutter-head a flat limb 7 projects, having parallel edges and a proper length to adapt the same for connection with an end on the elongated handle 8, as will be hereinafter more fully explained.

From a point above and near to the transverse centers of the pair of limbs 7 on the lower portions of the duplicate frame members 5 an undulating or essentially S-shaped slot $c$ is extended in each frame member 5 diagonally upward and away from the heel of the fixed cutter-jaw 6 thereon. The limbs 7 may be held spaced apart by their lapped engagement with the upper end of the handle 8 and be thereto secured by screws, rivets, or the like, as indicated at $d$, and between the frame members 5 a rock-arm 9 is inserted at one of its ends and pivoted thereon, as indicated at $e$, the frame members being held together above the rock-arm by the riveted stud $e'$.

A shear-blade 10 is introduced by one end thereof between the frame members 5, the blade being pivoted between said frame members near the edges $a$ by the bolt $f$, so that its cutting edge, which is convex, will be adapted to pass between the cutting edges $b$ of the fixed cutting-jaws 6, that are held spaced apart at their outer extremities by a transverse spacing-rivet $f'$.

Two similar link-plates 11 have like ends of each pivoted upon the inner end of the rock-arm 9 through the slots $c$ by a suitable pivot-bolt $g$, so that the link-plates are disposed loosely at the outer sides of the frame members 5.

The lower ends of the link-plates 11 are pivoted by a bolt $h$ upon the inner end of the cutter-blade 10, the pivot-bolt passing through the opposite slots $c$. Upon the outer end of the rock-arm 9 the upper end of a link-rod 12 is pivoted.

Upon a lever 13, that is held to rock on the handle 8 at a suitable distance from the rock-arm 9, so as to project laterally, the lower end of the link-rod 12 is pivoted, as indicated at $i$, so that a vibration of the free end of the lever toward and from the handle 8 will rock the arm 9 and correspondingly move the cutting-blade 10.

In service the operator grasps the handle 8 and the lever 13, then applies the implement to a small branch or twig on a bush or tree, the blade 10 being first rocked away from the jaws 6 by an outward movement of the lever 13, as represented by the full lines in Fig. 1, so as to permit the introduction of the branch or twig between the concave edges of the jaws 6 and the convex cutting edge of the blade 10. Pressure applied upon the handle 8 and the lever 13 will pull upon the link-rod 12, which will rock the outer end of the arm 9 downward and close the blade 10, thus causing the convex cutting edge of the blade to shear-cut the branch or twig that has been introduced between the concaved edges of the jaws 6 and the convexed edge of the blade, as indicated by the dotted lines in Fig. 1.

It will be seen that the connection of the shear-blade 10 by means of the link-plates 11 with the inner end of the rock-arm 9 and the outer end of said rock-arm with the lever 13 by means of the link-rod 12 affords a compound leverage for actuation of the blade 10 which is very powerful, so that the shears may be worked with ease and small limbs of trees or shrubbery be cut without excessive labor.

Having thus described my invention, I claim as new and desire to secure by Letters Patent—

1. A pruning implement, comprising a cutter-head having spaced frame members, integral jaw members extended laterally from the frame members and having concave upper edges, a cutting-blade having a convex cutting edge and pivoted to work between the frame members above and near the concave edges of the jaws, a rock-arm pivoted between the frame members, a loose connection between an end of the rock-arm and an end of the cutting-blade, and means to rock the arm from its other end.

2. A pruning implement comprising a cutter-head having spaced frame members, oppositely and sinuously slotted, jaw members projected from the frame members and having concaved upper edges, limbs extended from the jaws and frame members, a convex-edged cutting-blade pivoted between the frame members above and near the concave edges of the jaws, so as to work between them, a rock-arm pivoted near one end thereof between the frame members, link-plates loosely connected to the inner end of the rock-arm and likewise to the inner end of the cutter-blade, and means for rocking the arm.

3. The combination with a handle, and a lever pivoted laterally on the handle near one end of said handle, of a cutter-head, comprising two spaced frame members, oppositely and sinuously slotted, two jaw members projected from the like side edges of the frame members and having concaved upper edges, limbs extended from the jaws and frame members for connection with the handle, a convex-edged cutting-blade pivoted near one end between the frame members opposite the S-shaped slots therein and above the jaws so as to be adapted to work between them, a rock-arm pivoted near one of its ends between the frame members, link-plates lapped on opposite sides of the frame members and pivoted near their ends respectively upon an end of the rock-arm and the inner end of the cutter-blade, the pivots passing through the slot, and a link-rod pivoted at its ends respectively to the outer end of the rock-arm and to the lever near the handle.

In testimony whereof I have signed my name to this specification in the presence of two subscribing witnesses.

ALFRED SHEPHERD BOYD.

Witnesses:
JAMES D. BULLOCK,
S. T. CATLIN.